United States Patent
Wiser

(10) Patent No.: US 7,823,395 B2
(45) Date of Patent: *Nov. 2, 2010

(54) UNIVERSAL COUPLING DEVICE

(75) Inventor: Herman D. Wiser, Buda, TX (US)

(73) Assignee: Danfoss Chatleff, Inc., Buda, TX (US)

(*) Notice: Subject to any disclaimer, the term of this patent is extended or adjusted under 35 U.S.C. 154(b) by 227 days.

This patent is subject to a terminal disclaimer.

(21) Appl. No.: 12/154,720

(22) Filed: May 27, 2008

(65) Prior Publication Data
US 2008/0289343 A1 Nov. 27, 2008

Related U.S. Application Data

(63) Continuation of application No. 11/236,257, filed on Sep. 27, 2005, now Pat. No. 7,392,664.

(51) Int. Cl.
*F25B 45/00* (2006.01)
(52) U.S. Cl. .............................. 62/77; 62/298
(58) Field of Classification Search ............... 62/77, 62/298, 504, 511, 525, 324.6, 225, 222; 285/390, 285/355, 387, 386, 333, 85–90; 137/601.17; 251/363; 138/44, 98, 96 R, 96 T; 439/312, 439/320; 29/525.01; 236/92 B
See application file for complete search history.

(56) References Cited

U.S. PATENT DOCUMENTS

| | | | | | |
|---|---|---|---|---|---|
| 2,381,829 | A | * | 8/1945 | Livers | 285/332.3 |
| 2,926,027 | A | * | 2/1960 | Marquis, Jr. | 285/32 |
| 3,695,642 | A | * | 10/1972 | DeWoody | 285/148.3 |
| 3,776,577 | A | * | 12/1973 | Dickey | 285/31 |
| 3,864,938 | A | * | 2/1975 | Hayes, Jr. | 62/504 |
| 4,160,526 | A | * | 7/1979 | Flanagan | 239/427 |
| 4,549,756 | A | * | 10/1985 | Basile | 285/388 |
| 4,632,434 | A | * | 12/1986 | Proctor et al. | 285/39 |
| 4,784,177 | A | * | 11/1988 | Sepso et al. | 137/513.3 |
| 4,924,569 | A | * | 5/1990 | Kennedy | 29/890.14 |
| 5,014,729 | A | * | 5/1991 | Sepso et al. | 137/513.3 |
| 5,041,257 | A | * | 8/1991 | Sepso et al. | 264/319 |
| 5,186,021 | A | * | 2/1993 | Keller | 62/511 |
| 5,341,656 | A | | 8/1994 | Rust, Jr. et al. | 62/324.6 |
| 5,479,784 | A | * | 1/1996 | Dobmeier et al. | 62/117 |
| 5,520,421 | A | * | 5/1996 | Warren et al. | 285/89 |
| 5,695,225 | A | * | 12/1997 | Grenga | 285/125.1 |
| 5,707,084 | A | * | 1/1998 | Szabo | 285/23 |
| 5,832,744 | A | * | 11/1998 | Dorste et al. | 62/528 |
| 5,842,351 | A | * | 12/1998 | Earhart, Jr. | 62/117 |
| 5,862,676 | A | * | 1/1999 | Kim et al. | 62/197 |

(Continued)

OTHER PUBLICATIONS

Todd Legere. "Thermostatic Expansion Valve" http://www.hvacmechanic.com/txv.htm. Sep. 22, 2002.

*Primary Examiner*—Mohammad M Ali
(74) *Attorney, Agent, or Firm*—Trop, Pruner & Hu, P.C.

(57) ABSTRACT

A coupling in accordance with the present invention may be used to join devices together without the need for conduits or other intermediaries. A nut may be used to couple the coupling to a first device via a first thread portion and to a second device via a second thread portion. In some embodiments, the coupling may be affixed to one of the first or second devices.

10 Claims, 9 Drawing Sheets

U.S. PATENT DOCUMENTS

| | | | |
|---|---|---|---|
| 5,894,741 A * | 4/1999 | Durham et al. | 62/525 |
| 6,053,537 A * | 4/2000 | Guest | 285/148.19 |
| 6,289,930 B1 * | 9/2001 | Simon | 137/601.14 |
| 6,442,966 B1 | 9/2002 | Wiser | 62/511 |
| 6,691,924 B1 | 2/2004 | Vestergaard et al. | 236/92 |
| 6,805,384 B1 | 10/2004 | Wiser | 285/354 |
| 6,854,285 B2 | 2/2005 | Jessen | 62/225 |
| 7,201,404 B1 * | 4/2007 | Kronmeyer | 285/386 |

\* cited by examiner

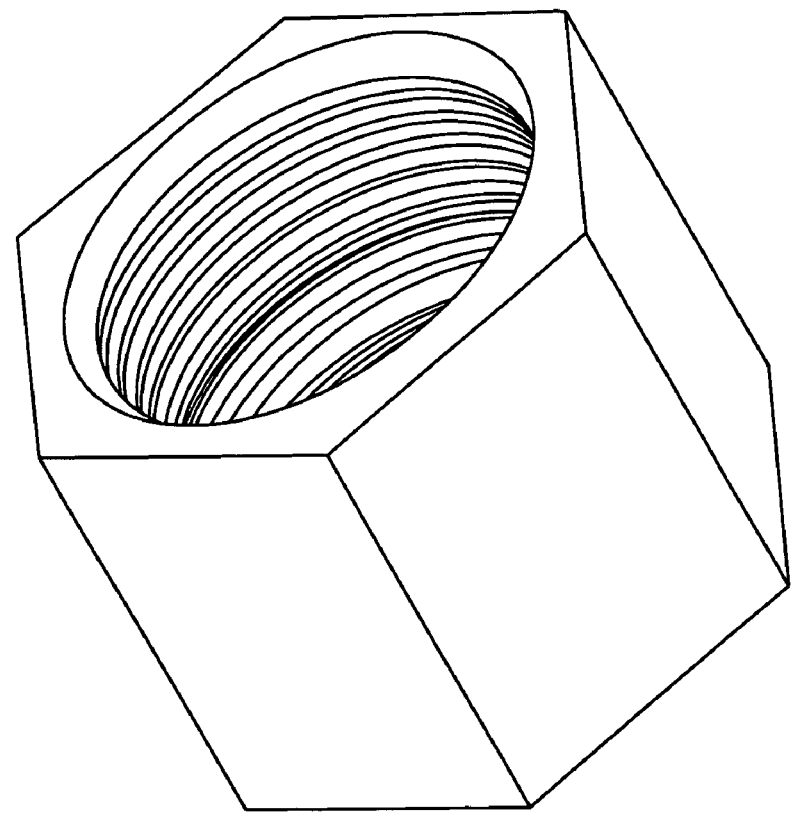
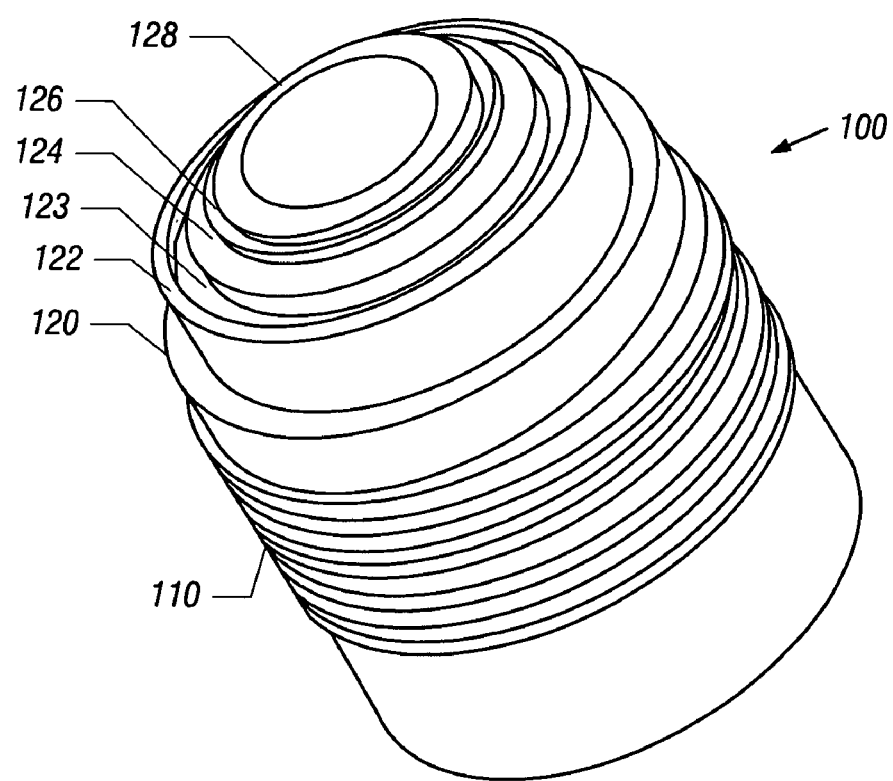
FIG. 2

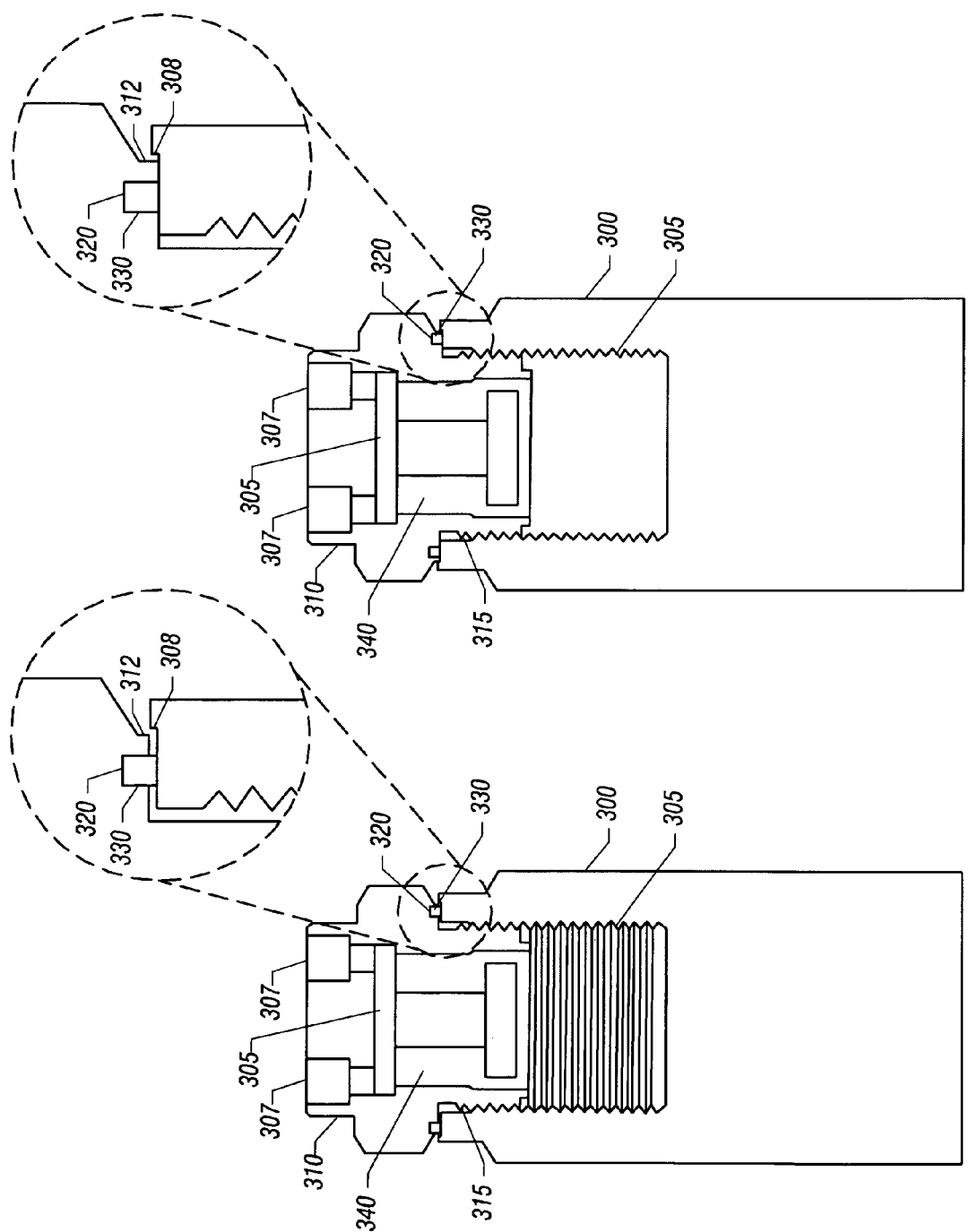

UNIVERSAL COUPLING DEVICE

This application is a continuation of U.S. patent application Ser. No. 11/236,257 filed Sep. 27, 2005 now U.S. Pat. No. 7,362,664 entitled "UNIVERSAL COUPLING DEVICE," the content of which is hereby incorporated by reference.

FIELD OF THE INVENTION

The present invention relates to couplings, and more particularly to a coupling for use in refrigeration systems.

BACKGROUND

Refrigeration systems typically include many components, such as compressors, condensers, heat exchangers, and valves which must be connected together in a way that effectively seals the interior of the refrigerant circulation system from the environment around it, as well as provide for the proper flow of fluid through the system. Refrigerants such as Freon which are introduced into such systems as the working fluid are expensive, hazardous to the environment, and sometimes toxic, and it is therefore critical that a closed circulation system be effectively sealed to prevent escape of the fluid or gas.

Further, it is often desirable that a connection between two components of a refrigeration system be easily disconnected, so that installation and replacement of a component may be accomplished without the use of heat connecting methods or extensive tools. To that end, couplings or unions are used to join together components or to couple a component to a line or other conduit.

Typically, these couplings are specialized or custom built for a particular design or manufacturer and cannot be universally used in different systems having different configurations. Furthermore, to perform maintenance activities around such couplings, significant effort is required, as these couplings are often welded, brazed, or otherwise fixed onto the lines, requiring significant effort to remove and replace them.

Certain cooling systems, particularly heat pump units, often include a thermostatic expansion valve (TXV). Such valves regulate the flow of refrigerant between the condenser and evaporator to ensure efficient operation and improved cooling efficiency. Accordingly, many more systems in the future will include a TXV, particularly as new energy requirements (e.g., 13 SEER) require use of a TXV in a cooling system.

Typically, a TXV is coupled between condenser and evaporator via plumbing lines or conduits that are affixed to ports of the TXV, e.g., via a sweat fitting, flare joints or the like. In other systems, a TXV includes a closely coupled nut, i.e., a fixed nut that is permanently attached to the TXV during manufacture, for later use in joining operations in the field. Problems occur in manufacture during attachment of this nut due to overheating caused by welding or other joining operation, causing substantial numbers of manufactured devices to be scrapped. Further as described above, such couplings between TXV and a conduit are typically specialized, raising manufacture costs and further increasing maintenance costs.

A need thus exists for improved couplings, particularly for use in connection with refrigeration and other cooling systems.

SUMMARY

In one embodiment according to the present invention a coupling may include a body having a first end to couple to an expansion device and a second end to couple to a distribution device, and a nut having a first thread portion to mate with the distribution device and a second thread portion to mate with the body. The nut may have differential threadings to allow ease of coupling between the expansion device and the distribution device. In some implementations, the body may be affixed to the expansion device.

Using such a coupling, a system may provide for improved joining of an expansion device, such as a thermostatic expansion valve (TXV) and a distributor or other body. Differently configured (e.g., sized) nuts may be used to mate with differently configured distribution devices. Furthermore, the coupling may include a number of stop members to mate with such differently configured distribution devices. Accordingly, to mate these devices, the nut may be threaded onto a first body in a first direction via a first thread portion of the nut to engage the nut with the first body and then the nut is threaded onto a second body in a second direction via a second thread portion of the nut to couple the bodies.

In some embodiments, an expansion valve having a port to transport fluid may be directly connected to a distribution device via a threadable connection to a threaded portion of the port. In such manner, additional components and zones subject to leaking can be avoided. Furthermore, the distribution device may include a plug within a channel of the device to direct fluid flow to a chamber of the device, e.g., a coin-shaped chamber, without the need for a piston or other flow control device. One or more sealing members may be positioned between devices to be joined to improve seating, in some implementations.

BRIEF DESCRIPTION OF THE DRAWINGS

FIG. 2 is a schematic diagram of a forward end of a coupling in accordance with one embodiment of the present invention.

FIG. 10A is a cross-sectional view of a coupling formed between a port of a TXV and a distribution device in a coupling position.

FIG. 10B is a cross-sectional view of a coupling formed between a port of a TXV and a distribution device in a joined position.

DETAILED DESCRIPTION

In various embodiments, a universal coupling is provided that may be used to couple a TXV directly to other system hardware, such as a distribution device coupled to, for example, a plurality of expansion tubes. In such manner, an intermediate conduit is avoided, reducing manufacturing and maintenance costs. Furthermore, the coupling may provide universality so that a single coupling can be used in connection with different manufacturers' TXVs, as well as different distribution devices that couple the TXV to other system hardware. Still further, embodiments of the present invention provide for easy installation and removal of a coupling, avoiding the need for expensive installation and maintenance activities.

Figure 1:
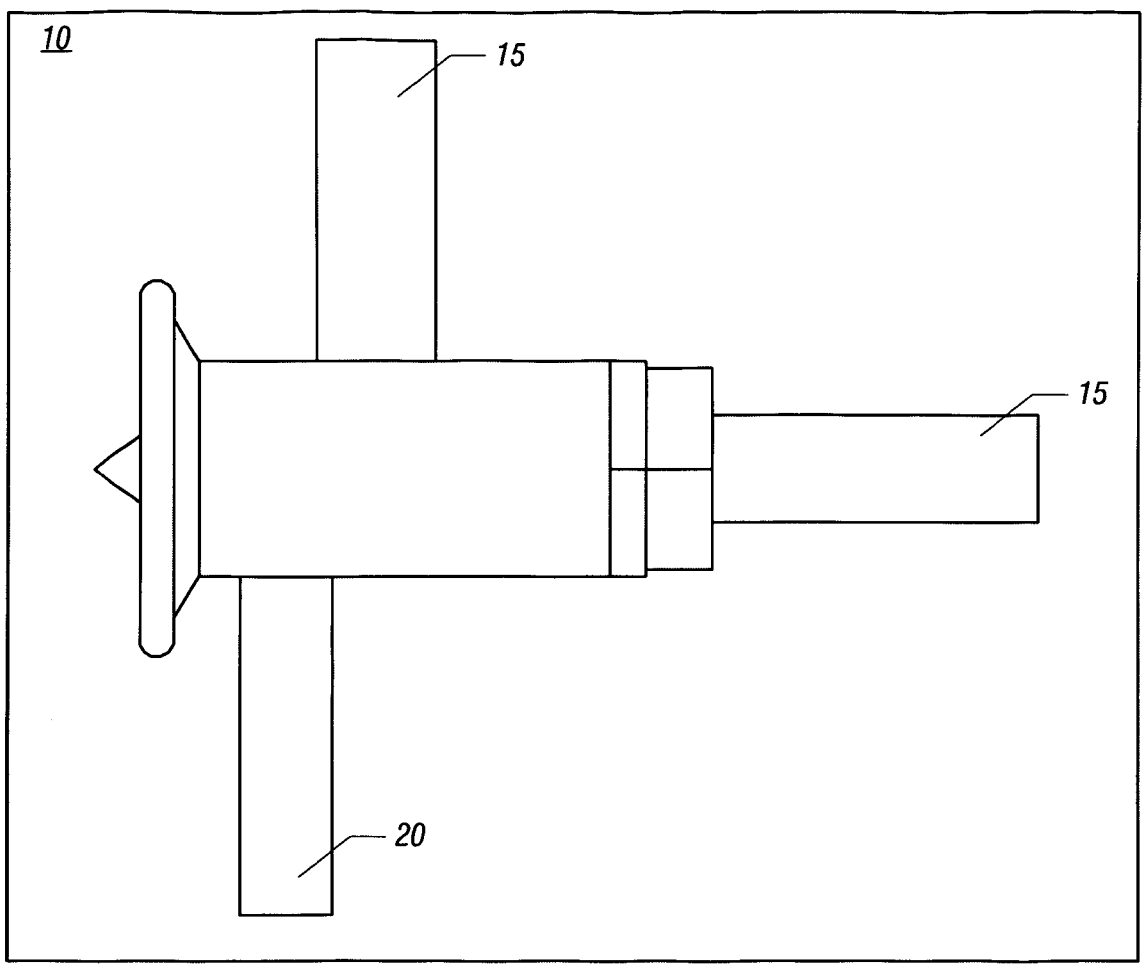
FIG. 1 is a block diagram of a thermostatic expansion valve.

Referring now to FIG. 1, shown is a schematic diagram of a TXV. TXV 10 includes an inlet port 20 and a first outlet port 15 and a second outlet port 15, one of which may be an alternative outlet. TXV 10 may be used to meter liquid refrigerant flow between different pressure sides of system. To allow for easy installation and access, TXV 10 may be adapted to mate with a coupling as described herein. In some embodiments, the coupling may be affixed to a port of TXV during manufacture, or may be later joined to the TXV.

Referring now to FIG. 2, shown is a schematic diagram of a forward end of a coupling in accordance with one embodiment of the present invention. While coupling 100 may be used for various applications, in a preferred embodiment coupling 100 may be used in connection with a TXV. For example, coupling 100 may be affixed to a port of the TXV. That is, a manufacturer of the TXV may adapt coupling 100 onto the TXV by welding, brazing, or the like. In other embodiments, a TXV previously manufactured may be fitted with such a coupling during installation of the TXV into a cooling system.

Still referring to FIG. 2, coupling 100 may include a threaded portion 110. As will be described further below, threaded portion 110 may mate with a nut or other tensioning mechanism. Threaded portion 110 may have a relatively fine pitch as compared to thread portions of devices to which coupling 100 is to be joined such as a distributor or the like. Above threaded portion 110 are a plurality of stop surfaces to enable use of coupling 100 with various distribution devices or other such devices that may be used to couple a TXV to a system line. While described in the context of a TXV, the scope of the present invention is not so limited and in other embodiments a universal coupling may be used in a variety of different couplings to join different lines, devices, valves, and the like together. For example, the coupling may be adapted to different median pressure or vacuum applications for liquid, gas, or both, such as natural gas or water couplings.

Shown in FIG. 2, the stop surfaces include a first stop surface 120 that may be used as a back stop for a tensioning member, as will be discussed further below. Coupling 100 further includes a second stop surface 122, a third stop surface 124, a fourth stop surface 126, and a fifth stop surface 128. As shown in FIG. 2, each of these stop surfaces may have different dimensions, with each stop surface closer to the final stop surface 128 having a smaller dimension and being located axially further away from threaded portion 110. One or more of the stop surfaces may have a substantially horizontal radial surface, and one or more may have an angularly disposed radial surface. As further shown in FIG. 2, a groove 123 may be formed between two of the stop surfaces. In some embodiments, groove 123 may be sized to receive a seal ring, for example an O-ring for use in improved sealing. As discussed below, in some implementations an additional O-ring may be used in connection with a body to which coupling 100 is adapted. As several examples, groove 123 may be sized to receive an O-ring such as that disclosed in U.S. Pat. No. 5,131,695 (referred to herein as a "squeeze ring") or an O-ring such as that disclosed in U.S. Pat. No. 6,805,384 (referred to herein as an "extrusion ring"), both of which are commonly assigned with the present patent application, and the disclosures of which are hereby incorporated by reference. While shown in the embodiment of FIG. 2 as including five such stop surfaces and a single groove, different numbers of stop surfaces and grooves may be present in different embodiments so that a coupling can be used with different devices.

Figure 3A:
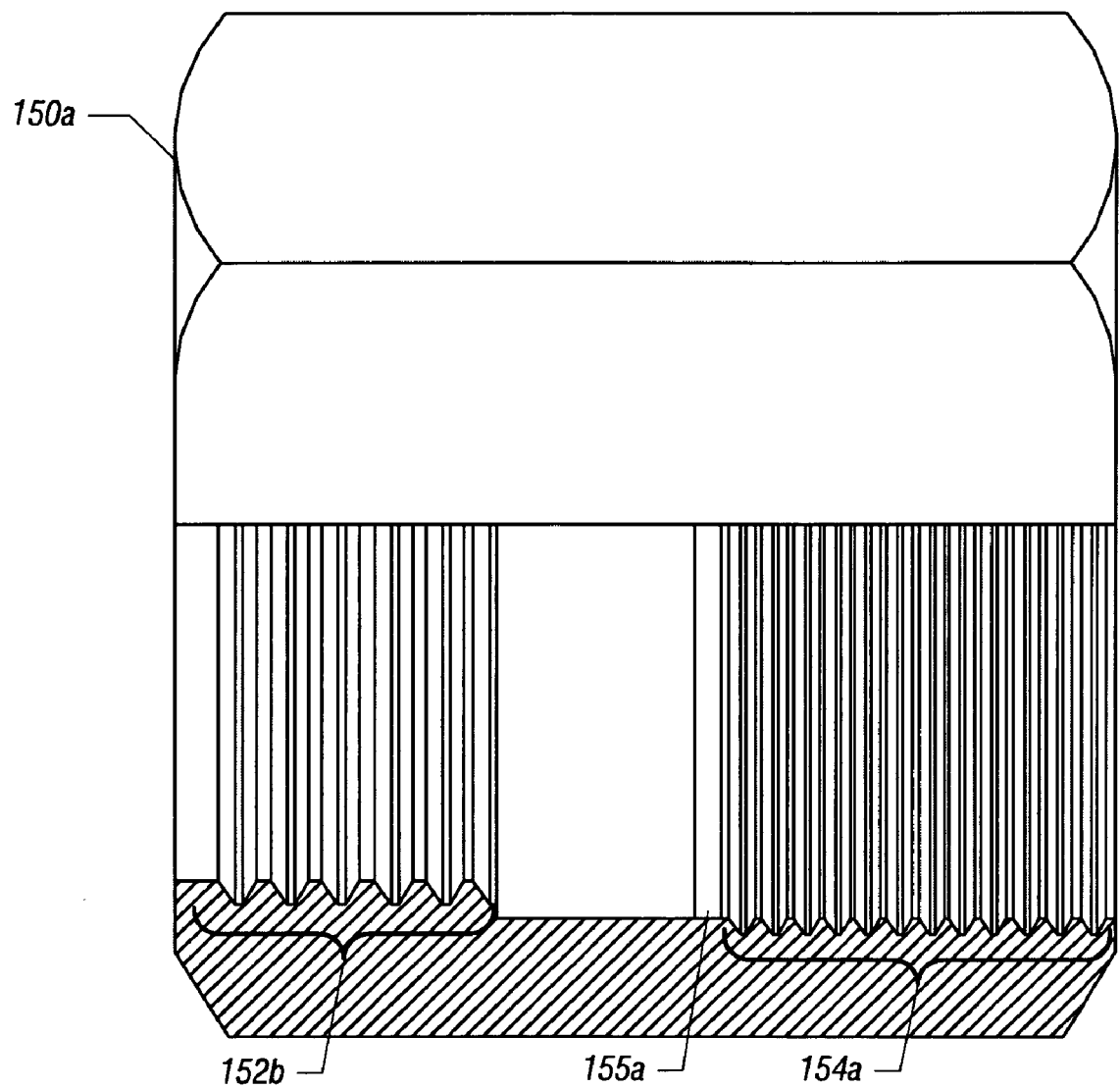
FIG. 3A is a schematic diagram of a nut in accordance with one embodiment of the present invention.

Referring now to FIG. 3A, shown is a schematic diagram of a nut 150a in accordance with one embodiment of the present invention. As shown in FIG. 3A, nut 150a which may be for example a hexagonal nut, includes a first thread portion 152a and a second thread portion 154a. As shown in FIG. 3A, these thread portions are of different pitches. Still further, in many embodiments these threads may be differential with respect to each other. That is, first thread portion 152a and second thread portion 154a have different pitches to create a differential movement. For example, one thread may be a 32 pitch thread and the second thread may be a 20 pitch thread. As the 32 pitch thread is unscrewed, nut 150a moves away from the seating edge at 0.03125" per revolution. The 20 pitch thread is simultaneously engaged, pulling the body (e.g., a distributor) towards the seat at 0.050" per revolution, producing a net movement of the distributor towards the seat of 0.050"-0.03125"=0.01875" per turn of nut 150a. In other embodiments, left hand threads may be used, both in a differential mode (with different pitches and both threads left-handed) and in opposing same or different pitches to create closure movement. Also shown in FIG. 3A is a stop surface 155a which may be used during coupling of nut 150a. Depending on a particular implementation, first thread portion 152a and second thread portion 154a may be of different dimensions (e.g., diameters and pitches). In one implementation, first thread portion 152a may be a 5/8-20 thread, while in a second implementation first thread portion 152a may be a 3/4-20 thread. In both implementations a second thread portion 154a has a finer dimension of 32, for example, to mate with a coupling and to create differential movement.

Figure 3B:
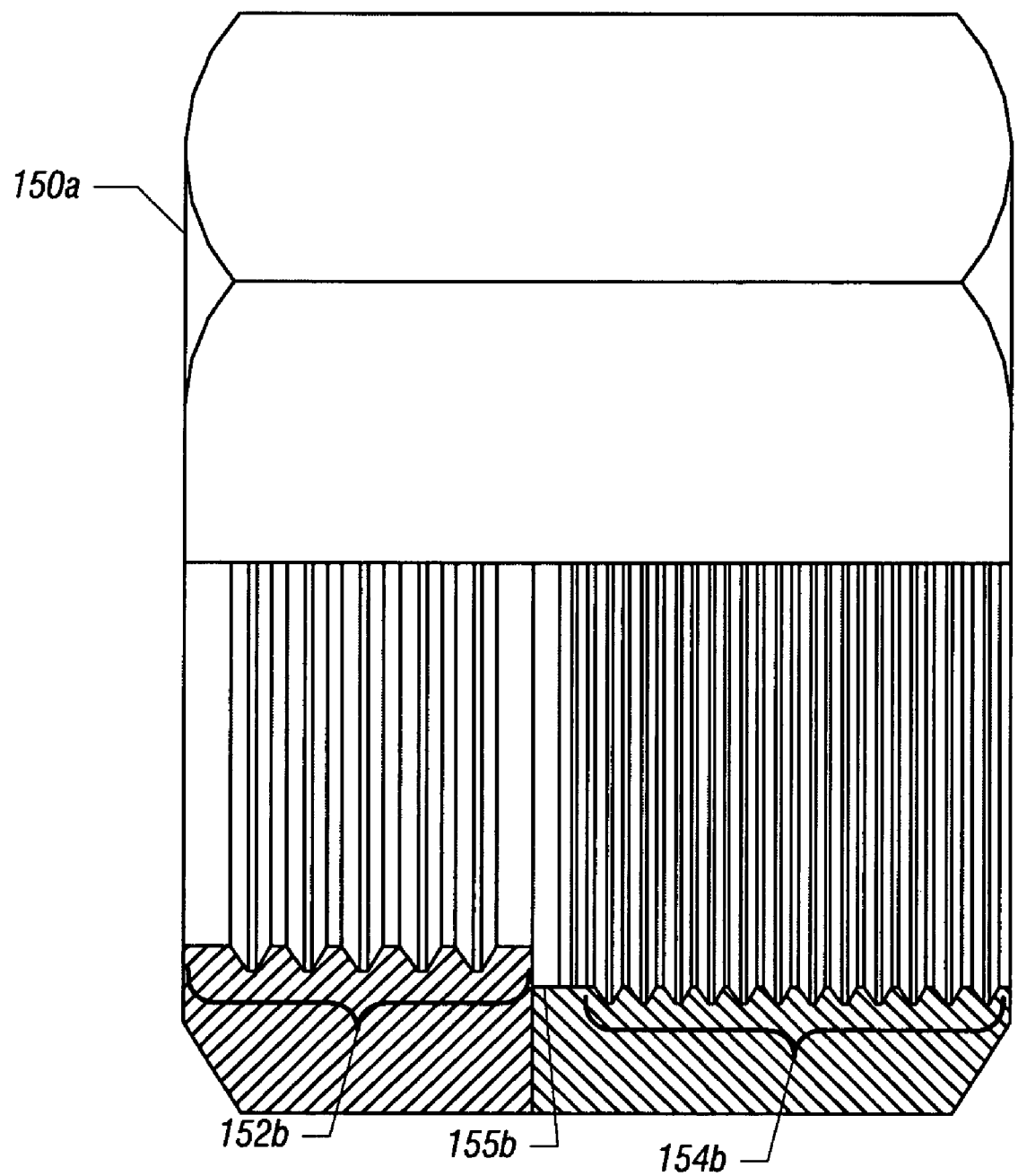
FIG. 3B is a schematic diagram of a nut in accordance with another embodiment of the present invention.

Referring now to FIG. 3B, shown is a schematic diagram of a nut 150b in accordance with another embodiment of the present invention. As shown in FIG. 3B, nut 150b includes a first thread portion 152b and a second thread portion 154b, each having different, differential pitches. Also shown in FIG. 3B is a stop surface 155b which may be used during coupling of nut 150b with a coupling. Depending on a particular implementation, first thread portion 152b and second thread portion 154b may be of different dimensions (e.g., diameters and pitches).

By providing differential threading, installation and maintenance of a coupling is greatly improved. For example, to join two devices together with a universal coupling, one thread portion of the nut may be threaded onto a threaded portion of the coupling in a first direction. Then, the coupling is located with respect to the second device (or vice versa) and the nut is then threaded in the opposite direction onto a threaded portion of the second device. In this manner, two devices may be joined via this single coupling and nut, avoiding the need for conduits or other intermediaries. One side of a coupling may be machined for a desired connection, such as a seal-type connection or a metal-to-metal connection, and the other side affixed in a selected manner to, e.g., a TXV. Thus to use a coupling, first a thread portion of a nut may be screwed onto a threaded portion of the coupling until the nut resets on a stop surface, e.g., a back stop surface of the coupling. Next, a threaded portion of a distributor may be placed against the open end of the nut. While keeping the other end of the distributor and the threaded end of the coupling from rotation, rotate the nut to engage the threaded portion of the distributor until the coupling and distributor engage each other. Finally, apply a recommended torque level so that the differential between the thread pitches pulls distributor and the coupling together.

Figure 4:
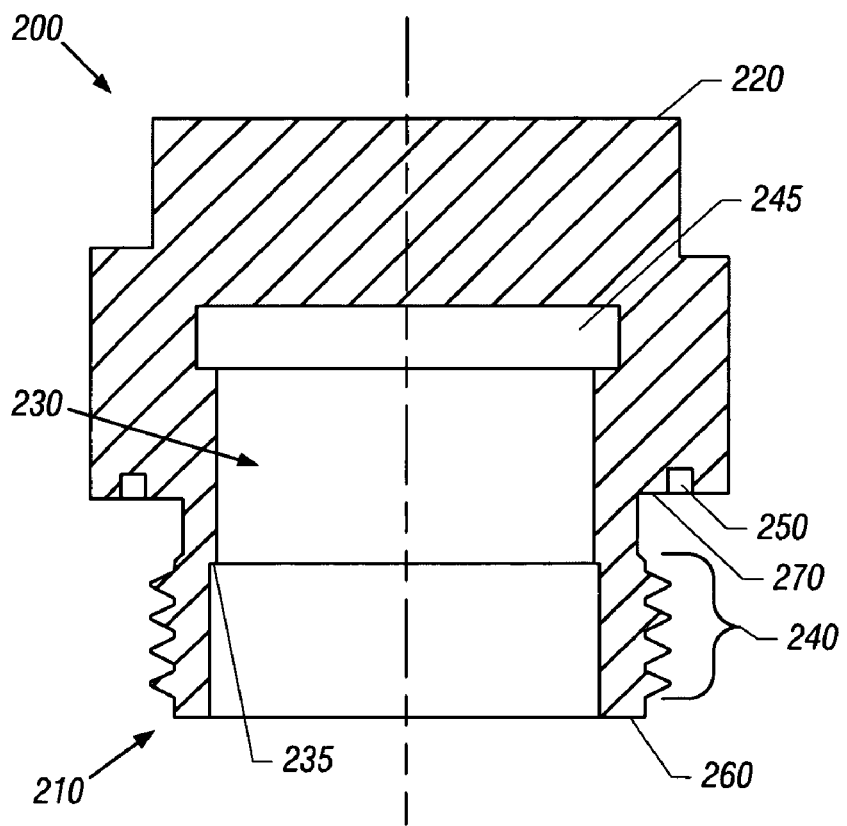
FIG. 4 is a cross-sectional view of a distribution device in accordance with one embodiment of the present invention.

Referring now to FIG. 4, shown is a cross-sectional view of a distribution device in accordance with one embodiment of the present invention. As shown in FIG. 4, distribution device 200 is formed of a body having a first end 210 and a second end 220. A channel 230 is defined within the body which in turn leads to a plurality of openings or ports (not shown in FIG. 4) to pass a fluid (e.g., a gas or liquid refrigerant) flowing through channel 230 to, for example, a number of evaporation lines connected to the ports. Channel 230 may terminate in a chamber 245, which may be a coin-shaped chamber. Channel 230 may also include a stop surface 235, adapted to mate with a piston, plug or other flow control device. Distribution device 200 includes an externally threaded portion 240 near first end 210. As will be described further below, threaded portion 240 mates with one of the threaded portions of a nut such as one of the nuts of FIGS. 3A and 3B. Still further, distribution device 200 includes a groove 250 which may be sized to receive a sealing member, such as an O-ring. Furthermore, in some embodiments a distribution device may include an annular protrusion 260 which may be used to create a metal-to-metal seal or to cause an extrusion of a sealing member of a device to which distribution device 200 is coupled. FIG. 4 also shows a stop surface 270 adjacent to groove 250 that may be used in mating with a corresponding coupling. While shown with this particular implementation in FIG. 4, a distribution device or other such device to be used with a coupling in accordance with an embodiment of the present invention may take many different forms, and may have different sizes, different functions and different features.

Figure 5:
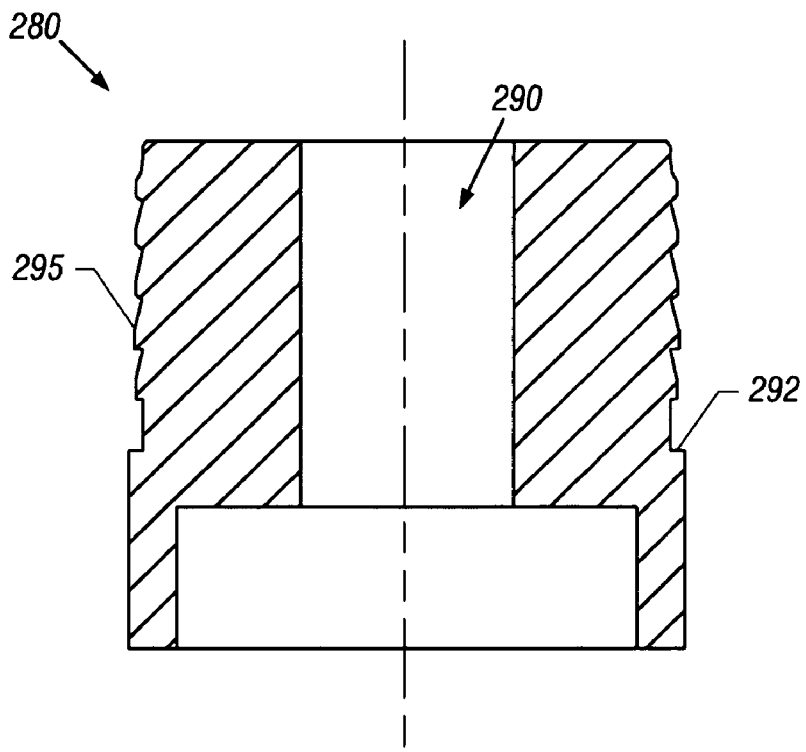
FIG. 5 is a cross-sectional view of a plug in accordance with one embodiment of the present invention.

In certain implementations, a distributor may be directly coupled to a TXV via a coupling in accordance with the present invention, without the need for a piston or other flow control device. However, in some embodiments, a plug, piston, or other mechanism may be inserted into the channel of a distribution device in order to better control flow of fluid therethrough. Referring now to FIG. 5, shown is a cross-sectional view of a plug in accordance with one embodiment of the present invention. As shown in FIG. 5, plug 280 may be inserted into a channel of a distribution device, such as distribution device 200 of FIG. 4. Plug 280 includes a channel 290 to allow fluid flow. An outer stop surface 292 may be present to mate with a corresponding surface for a distribution or other device with which plug 280 is used. Furthermore, plug 280 includes a plurality of protrusions or fins 295, which are used to set the plug into the distributor. In different embodiments, the number and angle of such fins may vary. In the embodiment shown in FIG. 5, five such fins are present, and may have an angle of between approximately 5%-25%, although the scope of the present invention is not so limited. Plug 280 may reduce expense and be more effective than the use of a piston, in many implementations.

Figure 6:
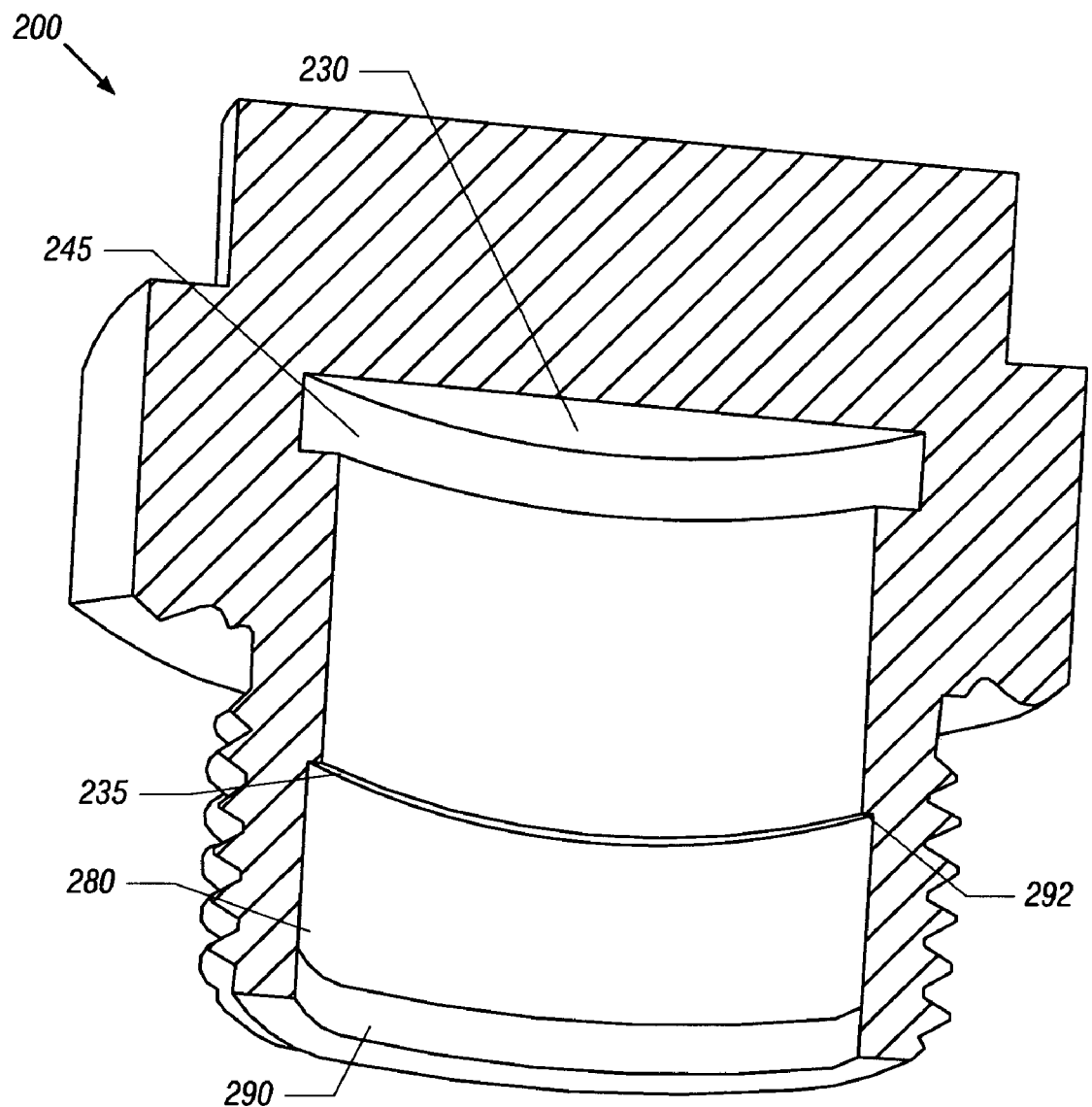
FIG. 6 is an isometric view of a distributor including a plug in accordance with one embodiment of the present invention.

Referring now to FIG. 6, shown is an isometric view of a distributor including a plug. As shown in FIG. 6, distributor 200 includes a plug 280 sized to fit within channel 230 of device 200. As shown in FIG. 6, stop surface 235 of distributor device 200 engages stop surface 292 of plug 280 to maintain the plug in the desired axial location. In various implementations, plug 280 may provide for proper distribution, and enable use of chamber 245 without using a cap with an external weld joint that can leak to the atmosphere. Channel 290 is large enough so as not to add any significant restriction to the flow of fluid with respect to the restrictions initiated by the TXV, but small enough to force the fluid flow to change direction 90° twice in order to convert all of the kinetic energy of the flowing fluid into chaotically homogenizing the gas/liquid mix, hence improving the distribution.

Figure 7A:
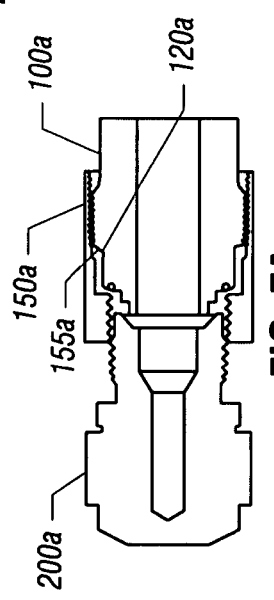
FIG. 7A is a cross-sectional view of a coupling in an engagement position in accordance with one embodiment of the present invention.

Referring now to FIG. 7A, shown is a cross-sectional view of a coupling in an engaged position. As shown in FIG. 7A, coupling 100a has a nut 150a threaded onto it such that a stop surface 155a of nut 150a is resting on a stop surface 120a of coupling 100a. To achieve this position, nut 150a may be threaded onto coupling 100a in a first direction (e.g., clockwise) until the stop surfaces engage.

Figure 7B:
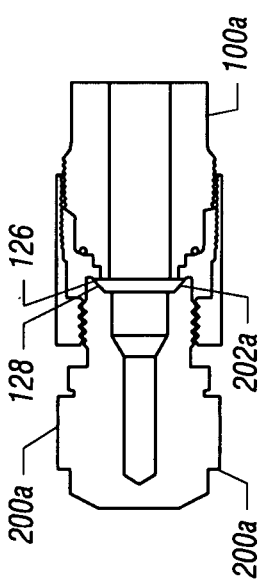
FIG. 7B is a cross-sectional view of the coupling of FIG. 7A in a closed position.

Next, a device such as a distributor 200a may be brought into close axial relation with the open end of nut 150a. To join these bodies together, nut 150a may then be threaded in the opposite direction such that the second threaded portion of nut 150a threads onto the threaded portion of device 200a. Accordingly, the joined coupling as shown in FIG. 7B is formed. Note that in the embodiment of FIG. 7B, a metal-to-metal seal is achieved via a bottom angular protrusion 202 of the joining end of distributor 200a and several of the stop surfaces 126 and 128 of coupling 100a. These bodies may have different dimensions in different embodiments to achieve desired coupling, while retaining universality with a number of different devices, joints and the like.

Figure 8A:
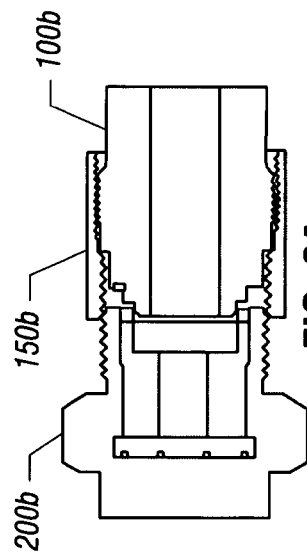
FIG. 8A is a cross-sectional view of a coupling in an engagement position in another embodiment.
Figure 8B:
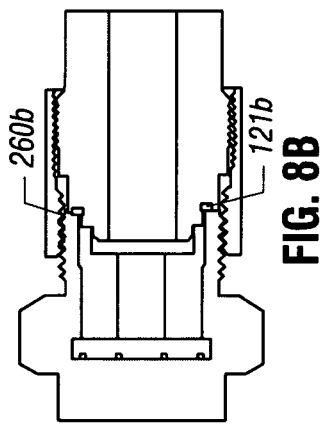
FIG. 8B is a cross-sectional view of the coupling of FIG. 8A in a closed position.

Referring now to FIG. 8A, shown is a cross-sectional view of a coupling of devices in accordance with another embodiment of the present invention. As shown in FIG. 8A, a coupling 100b has a nut 150b threaded onto it such that the nut and coupling are in an engaged position. In the engaged position, a second device 200b (e.g., a distributor) is brought into close axial communication with the nut. Then, nut 150b is threaded onto the threaded portion of device 200b to join device 200b to coupling 100b, as shown in FIG. 8B. An extrusion-type seal is present such that annular protrusion 260b of device 200b protrudes into sealing member 121b, extruding a portion of it to form the seal.

Figure 9A:
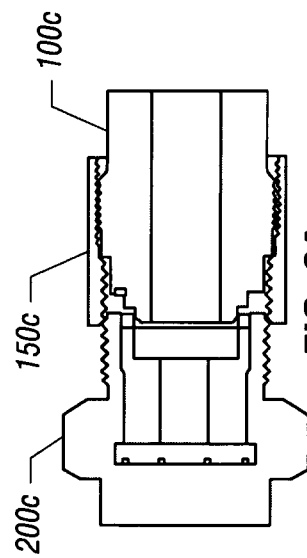
FIG. 9A is a cross-sectional view of a coupling in an engagement position in yet another embodiment.
Figure 9B:
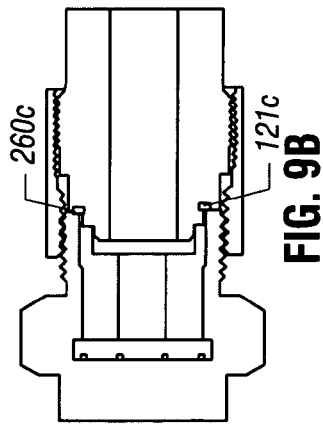
FIG. 9B is a cross-sectional view of the coupling of FIG. 9A in a closed position.

Referring now to FIG. 9A, shown is a cross-sectional view of a coupling of devices in accordance with still another embodiment of the present invention. As shown in FIG. 9A, a coupling 100c has a nut 150c threaded onto it such that the nut and coupling are in an engaged position. In the engaged position, a second device 200c (e.g., a distributor) is brought into close axial communication with the nut. Then, nut 150c is threaded onto the threaded portion of device 200c to join device 200c to coupling 100c, as shown in FIG. 9B. A squeeze-type seal may be present using sealing member 121c to form the seal.

In other embodiments, a distributor-type device may be directly coupled to a port of a TXV or other expansion device without use of a nut or other tensioner mechanism. Referring now to FIG. 10A, shown is a cross-sectional view of a coupling formed between a port 300 of a TXV and a distribution device 310. As shown in FIG. 10A, port 300, which may be an output port of a TXV to transport a fluid flow (in either direction, in some embodiments) has an internal threaded portion 305. This internal threaded portion 305 is adapted to mate with a distribution device 310. Specifically, distribution device 310 may act as an outlet port and a distributor to receive a fluid flow from the TXV and pass it to a plurality of outlets 307, which may be coupled to expansion tubes, for example (not shown in FIG. 10A).

Still referring to FIG. 10A, distribution device 310 includes an external threaded portion 315 extending from a lower end of the device. Furthermore, a recess 305, which may be a cylindrical recess formed at the end of a channel that receives fluid flow from the TXV, may provide passage for fluid through the plurality of outlets 307, which may extend through the top of distribution device 310, for example.

To further aid in sealing, an annular groove 320 may be formed in distribution device 310 to receive a sealing member 330, which may be an O-ring. In some embodiments, the O-ring may be extruded upon mating with the top end of port 300 to provide an extrusion seal as shown in FIG. 10B, which is a cross-sectional view of a joined coupling. As shown in FIG. 10B, seal 330 is extruded between an outer edge 312 of the lower end of distribution device 310 and an inner edge 308 of a top end of port 300.

Referring back to FIG. 10A, a plug 340 may be fitted within distribution device 310 to direct the fluid flow into recess 305. Using this implementation, the need for a piston metering type device is avoided, reducing costs and complexity. Furthermore, by directly coupling distribution device 310 to a TXV, the expense and complexity of additional components, conduits and the like is avoided. Furthermore, due to the internal direct connection, risk of fluid loss through the connection is reduced or avoided. Furthermore, the design of distribution device 310 itself provides for smooth flow of fluid while avoiding the need for a piston.

Figure 11:
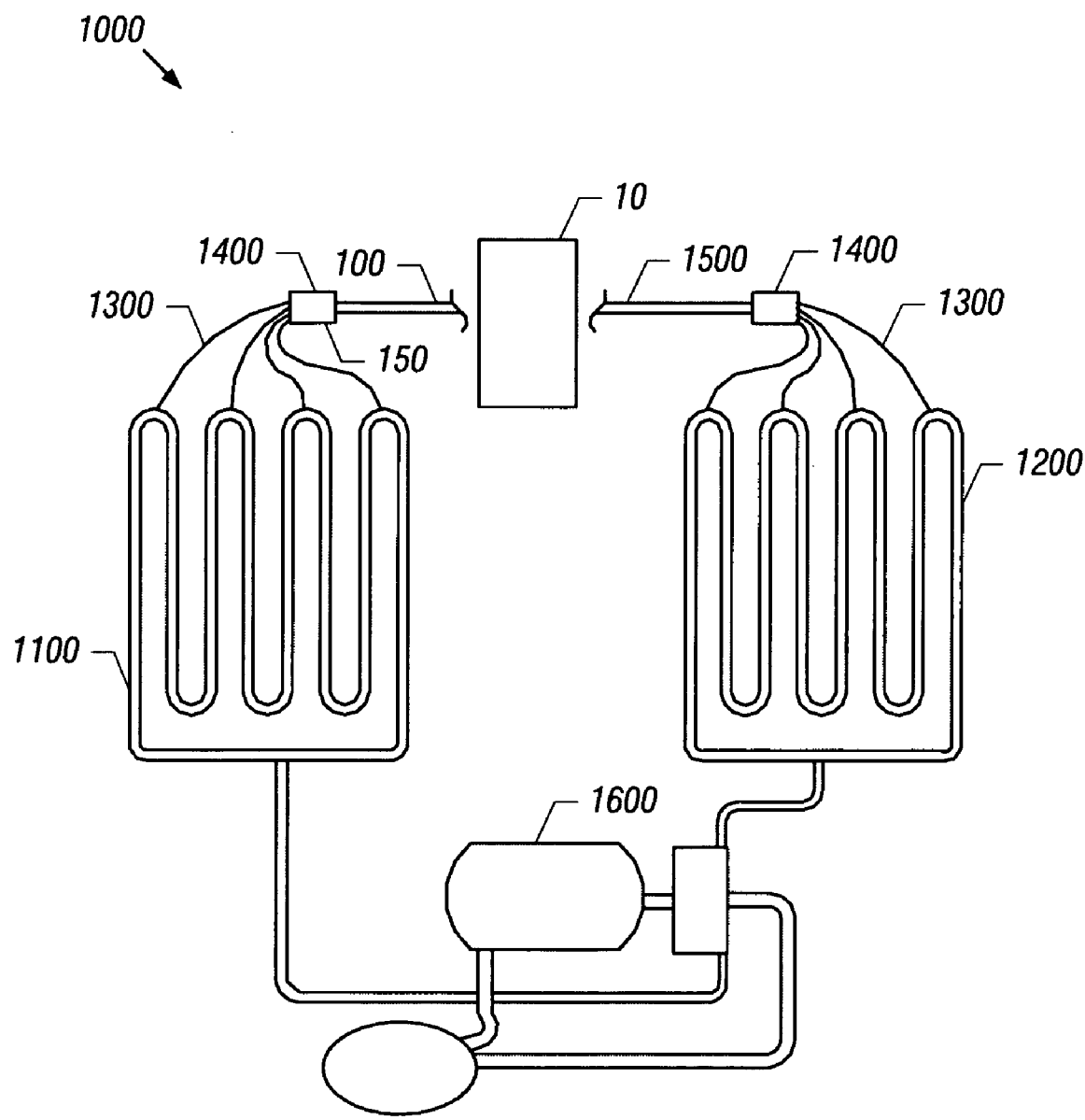
FIG. 11 is a block diagram of a system in accordance with one embodiment of the present invention.

FIG. 11 is a schematic diagram of a system 1000 in accordance with the present invention. System 1000 may be, for example, a heat pump. The system 1000 includes a first coil 1100 and a second coil 1200, which may be evaporator and condenser coils, respectively (or vice versa), and which may be controlled to act as either depending on a desired system operation. Connected to each of the coils is a plurality of tubes 1300 which terminate in a device 1400 which may be, at least on the left side, a distributor which in turn is connected to an expansion valve 10 via a coupling 100 and a nut 150 in accordance with an embodiment of the present invention. Valve 10 may be connected to tubing 1500 via another port of the valve 10. It is to be understood that system 1000 may include many other typical components well known to those of skill in the art but not needed for understanding of the present invention, such as compressor 1600, for example. In addition to such a heat pump, it is to be understood that embodiments of the present invention may be used with other refrigeration systems such as air conditioners, cooling towers and the like.

Thus in various embodiments, TXV's may be coupled to any one of different styles of refrigerant distribution devices via a coupling in accordance with the present invention to make installation of the TXV and choice of the distributor easier for the manufacturer. Furthermore, repair of a unit including such a coupling is simplified.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    an expansion device having a plurality of ports, one of the plurality of ports to be coupled to a distribution line;
    a coupling body adapted to the one of the plurality of ports, the coupling body having a thread portion; and
    a nut having a first thread portion to mate directly with the thread portion of the coupling body and a second thread portion to mate directly with a distribution device coupled to the distribution line such that a direct connection between the expansion device and the distribution device is provided without an intermediate conduit, wherein the first and second thread portions have different pitches with respect to each other to create a differential movement to engage the coupling body with the distribution device.

2. The system of claim 1, wherein the coupling body comprises a plurality of stop members, at least one of the plurality of stop members to mate with differently configured distribution devices.

3. The system of claim 2, wherein a pair of the plurality of stop members defines an annular groove dimensioned to retain a sealing member.

4. The system of claim 2, wherein at least one of the plurality of stop members is to provide a metal-to-metal seal between the coupling body and the distribution device.

5. The system of claim 1, wherein the nut is to couple to the coupling body in a first direction and to couple to the distribution device in a second direction.

6. The system of claim 1, further comprising a stop mechanism on the coupling body to retain the nut in an engagement position in which the first thread portion is coupled to the coupling body, wherein the engagement position is to receive the distribution device.

7. The system of claim 1, further comprising a plug for insertion into the distribution device, the plug having a plurality of circumferential ridges to retain the plug in the distribution device, the plug having a channel for fluid transport.

8. The system of claim 2, wherein the coupling body is the one of the ports of the expansion device.

9. A method comprising:
    threading a nut onto a first body in a first direction via a first thread portion of the nut to engage the nut on a first stop surface of a plurality of stop surfaces of the first body, each of the plurality of stop surfaces having a different dimension to mate with a differently sized device; and
    threading the nut onto a second body in a second direction via a second thread portion of the nut to couple the first body to the second body, wherein the first and second thread portions have different pitches with respect to each other to create a differential movement to engage and directly mate the first body with the second body without an intermediate conduit, wherein the first body comprises a coupling for an expansion device and the second body comprises a distribution device.

10. The method of claim 9, wherein threading the nut onto the first body moves the nut in a first axial direction and threading the nut onto the second body moves the nut in a second axial direction.

* * * * *